Dec. 15, 1931.   H. E. MUSSELWHITE   1,836,037
AIR MOTOR
Filed Dec. 17, 1929   3 Sheets-Sheet 2
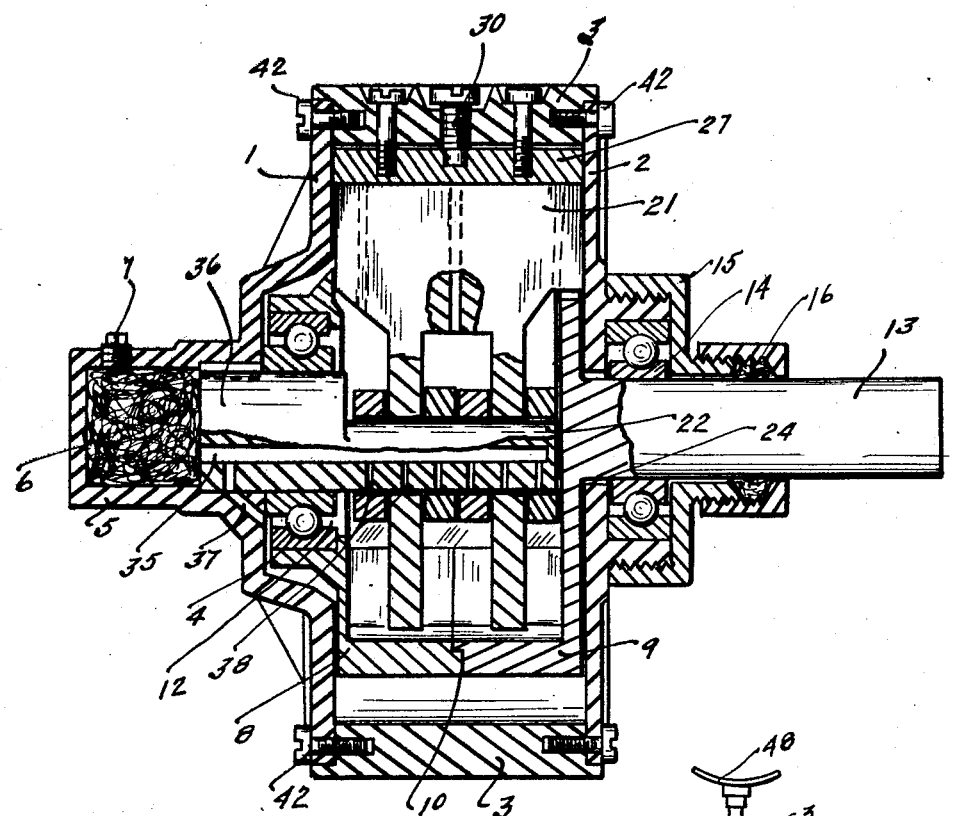
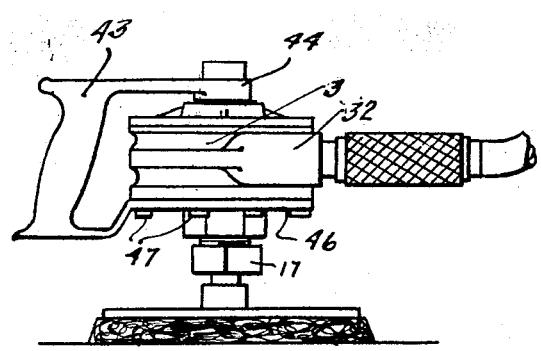
Inventor
Harry E. Musselwhite
By Thomas Belger
Attorney Dec. 15, 1931.  H. E. MUSSELWHITE  1,836,037
AIR MOTOR
Filed Dec. 17, 1929    3 Sheets-Sheet 3
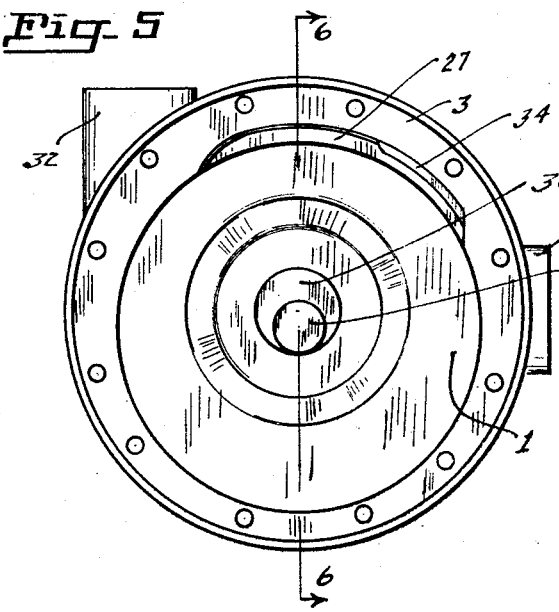
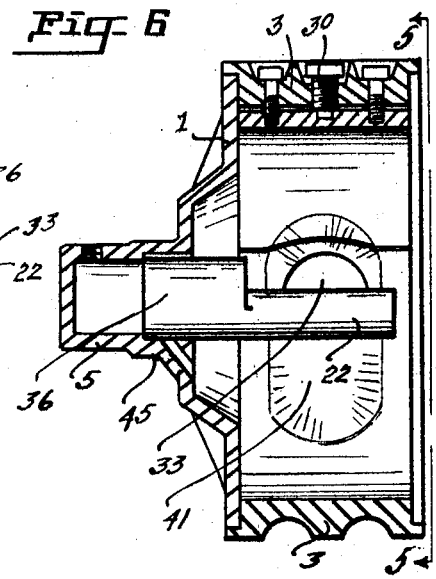
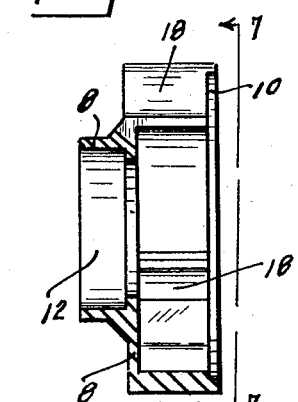
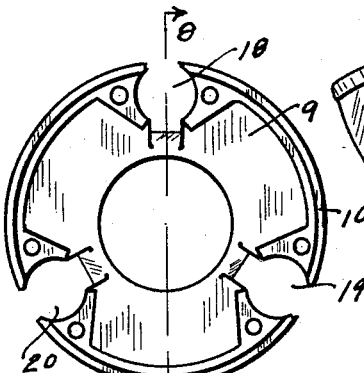
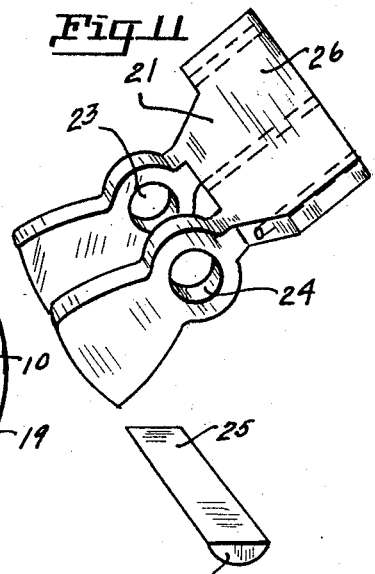
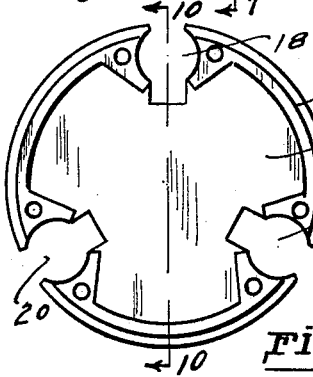
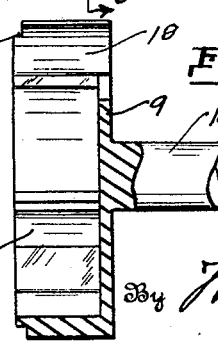
Inventor
Harry E. Musselwhite
By Thomas Bilyeu
Attorney

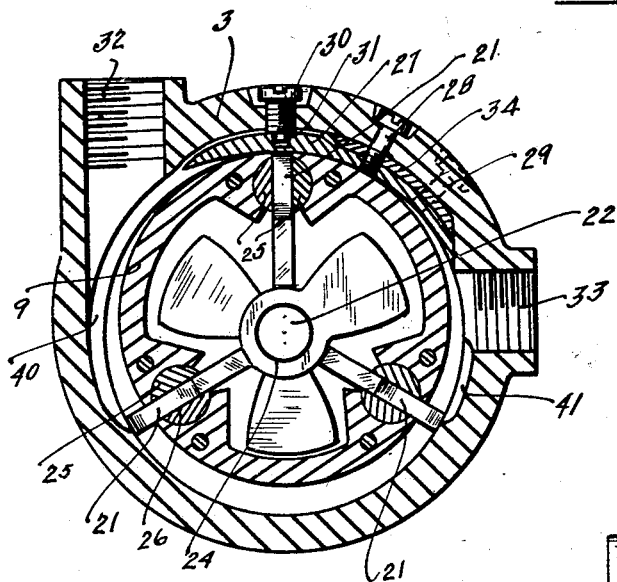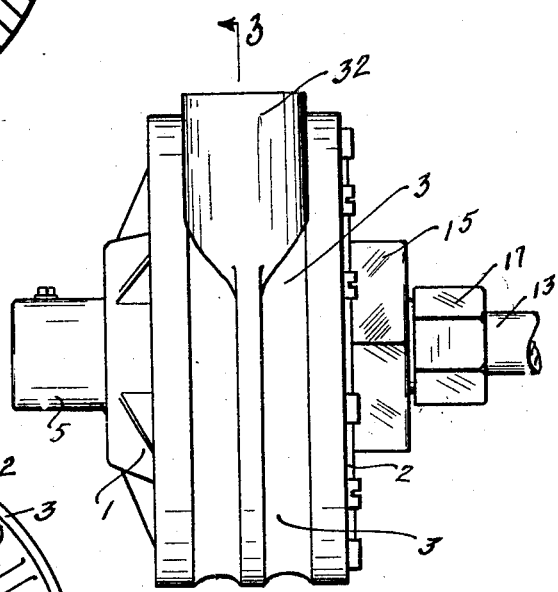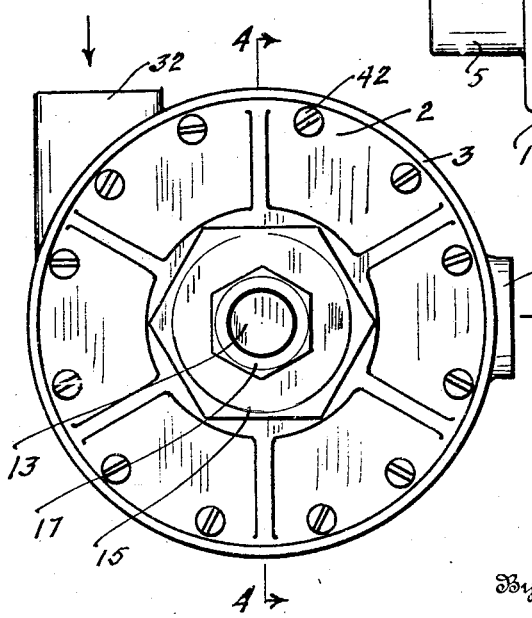

Patented Dec. 15, 1931

1,836,037

UNITED STATES PATENT OFFICE

HARRY E. MUSSELWHITE, OF PORTLAND, OREGON, ASSIGNOR TO GAS TURBINE CO., OF PORTLAND, OREGON, A CORPORATION OF OREGON

AIR MOTOR

Application filed December 17, 1929. Serial No. 414,785.

The object of my invention is to utilize the device as a prime mover in the development of power by the passing of a compressible fluid under pressure therethrough.

The invention, in its simplified form, consists of a cylindrical rotor head secured together and mounted within a housing with balanced, reciprocating blades mounted therein and adapted to being rotated within the casing and having a reciprocating motion imparted thereto relative to the head. Suitable frictionless bearings are disposed within the housing and an adjustable shoe is adapted for manual adjustment from the outside of the casing.

The operating head, disposed within the casing, is composed of two parts each of which has a stub shaft outwardly extending therefrom which forms the support for the head and one of which is a power shaft to which a pulley may be applied. Suitable means is provided for lubricating the assembly that is automatic in its operations.

The primary object of my invention is for the generation of power through the passing of a compressible fluid under pressure therethrough.

A further object of my invention is for the compressing of a compressible fluid, as air or gas, when driven by a prime mover to form a compressor.

A still further object of my invention consists in providing a portable prime mover that generates a relatively large unit of power per unit of weight and which runs at a relatively high speed. As a prime mover the same is adapted for grinding, polishing, boring, drilling and, in fact, for performing all kinds of work where a relatively large amount of power is required per unit of weight.

A still further object of my invention resides in a construction that reduces vibration to a minimum and provides a prime mover that may be used over a relatively long period with a minimum of adjustment, alteration and repair.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is an end view of the assembled device, the same being taken on the end to which the pulley is to be applied when the device is used as a prime mover, or for driving the device when it is to be used as a compressor.

Fig. 2 is a side view of the assembled device.

Fig. 3 is a sectional, end view of the assembled device, the same being taken on line 3—3 of Fig. 2 looking in the direction indicated.

Fig. 4 is a longitudinal, sectional, side view of the device, the same being taken on line 4—4 of Fig. 1 looking in the direction indicated.

Fig. 5 is an end view of the casing, and illustrating one of the end housings and the hub secured thereto, the same being taken on line 5—5 of Fig. 6 looking in the direction indicated.

Fig. 6 is a sectional, side view, taken on line 6—6 of Fig. 5 looking in the direction indicated.

Fig. 7 is an end view of one of the rotor heads, the same being taken on line 7—7 of Fig. 8 looking in the direction indicated.

Fig. 8 is a sectional, side view, taken on line 8—8 of Fig. 7 looking in the direction indicated.

Fig. 9 is an end view of the other of the rotor heads.

Fig. 10 is a sectional, side view taken on line 10—10 of Fig. 9 looking in the direction indicated. In Figs. 9 and 10, I show, in detail, the construction of the rotor head with which the shaft is formed integral therewith for the taking off of the power or the shaft to form the driven shaft when the device is being used as a compressor, or form the driving shaft when the device is to be used as a prime mover.

Fig. 11 is a perspective, end view of one of the blades.

Fig. 12 is a perspective, end view of one of the bearings disposed within the rotor head and against which the blades move.

Fig. 13 is a top, plan view of the assembled device, illustrating a handle secured thereto and illustrating the same hitched to an air line and illustrating the same having a burnishing or polishing wheel secured to the driving shaft.

Fig. 14 illustrates the same in use as a portable drill.

Like reference characters refer to like parts throughout the several views.

I preferably form the housing of my device of end sections 1 and 2 between which a central rim 3 is disposed. The end section 1 has a recess 4A disposed therein into which the wall of the recess 12 is placed. The end section 2 has a threaded flange 15A extending outwardly therefrom. The same end section has a hub 5 outwardly extending therefrom in which a lubricating carrier, as waste 6, is disposed. The waste material is thoroughly saturated with a lubricant to lubricate the bearing and the shaft engaging the end of the lubricant carrier. A plug 7 is threaded through the hub and closes the filler hole through which the lubricant is admitted into the lubricant carrier. Referring to Figs. 7, 8, 9 and 10, a split rotor head comprised of sections 8 and 9 are secured together. A recess 10 is formed within one of the head sections and a projecting rim 11 is formed upon the other head section. The recess and rim are made with close precision fits to maintain the sections in place and in alignment when they are assembled within the split housing. A recess 12 is formed within the outer end of the head section 8 into which the roller bearing 4 is disposed. The oppositely disposed head section 9 has a shaft 13 made integral therewith that extends outwardly through the end section 2 of the device and a roller bearing 14 is disposed within the recess formed by the flange 15A. A hub 15 is threadably secured to the flange 15A and acts as a closure for the roller bearing recess. A relatively tight connection is formed about the shaft 13 by placing a gasket 16 about the shaft and which is tightened upon the shaft and to the hub 15 by a gland nut 17.

I have here shown my device having a plurality of vanes disposed within the housing and I have shown the head as having three vaned blades disposed therein. Cylindrical bearings 18, 19 and 20 are in registerable alignment with each other and are disposed in equal spaced relationship about each of the head forming elements and the blades 21 are assembled within the head with the stationary shaft 22 passing through the openings 23 and 24 of the blades. When the blades are placed in position, bearing blocks 25 that are cylindrical upon their outside are placed within the bearings 18, 19 and 20. Two bearing blocks with the flat surfaces of the block facing each other and engaging the flat surfaces 26 of each blade is placed within each bearing opening. The blades are made to balance about the shaft 22 in order that they may easily rotate when they are rotated at a relatively high rate of speed. A plurality of balancing or equalizing parts 26A are disposed longitudinally within the flat surface 26 of each blade. The head sections 8 and 9, respectively, are rotated so that their outer periphery rotates substantially in contact with the adjustable shoe 27 which is disposed within the housing. The shoe 27 is adapted for being adjustably positioned from the exterior of the housing. The shoe is supported upon the adjusting screws 28 and 29 that extend through the housing and are in threaded relationship with the shoe. A fine adjustment is obtained upon the shoe by the adjusting of the screw 30 that is in threaded relationship with the housing itself. The inner end 31 of the screw engages upon the shoe itself and adjustably positions the same inwardly. I have here shown my device as a compressed fluid motor and when operating as such the operating fluid enters through the inlet port 32 and exhausts through the exhaust port 33. To prevent the escaping of the fluid past the adjustable shoe 27, I recess the shoe upon the upper side and place a compressible gasket 34 between the shoe and the inner peripheral surface of the housing.

The lubricating oil passes through a distributor hole 35 running longitudinally of the member 36 of shaft 22 and is distributed therefrom through the distributor holes 37 and 38. The shaft 22 is maintained stationary and the inner end of the shaft is made off center to form an eccentric about which the blades are made to rotate. The inner surface of the central housing member is recessed as shown at 40 and 41 in Fig. 3 to facilitate the passing of the operating fluid into the expansion and exhaust chambers. The central housing member and the two end members are fastened together by any suitable fastening means as by set screws 42. I have found best results are obtained wherein recesses are formed in the outer end surfaces of the central section into which the end housing sections are adapted. This form of construction maintains the whole assembly in precise position and alignment and facilitates the assembling and disassembling of the same in precise position.

I have found that the device may be made and used as a portable burnishing, power-driven, prime mover when a handle 43 is removably secured to the device by any suitable fastening means as by the placing of a yoke 44 about the hub 45 and by the placing of the oppositely disposed side of the handle member 46 in intimate contact with the oppositely disposed side of the machine and secure the same thereto by any suitable fastening means as by adjusting screws 47.

Where the device is to be used as a drill, a breast rest 48 terminates the outer end of the hub 45 and a drill holder 49 may be adapted to the oppositely disposed end or the power outlet end of the shaft to which the same is secured.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a housing having journals in axial alignment with each other disposed in the oppositely disposed end walls of the housing, a rotor revolvably disposed within the housing and a shaft disposed upon one end of the rotor that extends through the housing, means for maintaining a leak proof joint where the shaft passes through the housing, counterbalanced reciprocating blades disposed within the rotor, bearing engaging opposite sides of each blade and rockably journaled within the rotor, each blade having one or more holes running from the periphery of the blade through the body of the blade, means for reciprocating each of the blades relative to the rotor as the rotor is rotated, shoes adjustably disposed within the housing and adapted for adjustment from the exterior of the housing and a compressible packing disposed between the shoe and the housing.

2. In a device of the class described, the combination of a housing, a two part rotor rotatably disposed within the housing, a power shaft extending through the housing and formed integral with one of the rotor sections, a plurality of counterbalanced blades disposed within the rotor, means for imparting a reciprocating movement to the blades relative to the rotor as the rotor is rotated, bearings engaging the sides of the blades and disposed at opposite sides of the blades and journaled relative to the rotor, balancing holes extending through the blades from the peripheral edge of the blade toward the center of rotation and an adjustable shoe disposed within the housing and means for adjusting the shoe from the exterior of the housing.

HARRY E. MUSSELWHITE.